(12) United States Patent
Katou

(10) Patent No.: US 8,651,667 B2
(45) Date of Patent: Feb. 18, 2014

(54) PROJECTOR AND METHOD OF CONTROLLING THE SAME

(75) Inventor: Atsushi Katou, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 299 days.

(21) Appl. No.: 12/737,530

(22) PCT Filed: Aug. 12, 2008

(86) PCT No.: PCT/JP2008/064470
§ 371 (c)(1),
(2), (4) Date: Jan. 21, 2011

(87) PCT Pub. No.: WO2010/018623
PCT Pub. Date: Feb. 18, 2010

(65) Prior Publication Data
US 2011/0116050 A1    May 19, 2011

(51) Int. Cl.
*G03B 21/00* (2006.01)
(52) U.S. Cl.
USPC ........................... 353/31; 353/121; 348/744
(58) Field of Classification Search
USPC .......... 353/31, 33, 50, 51, 121; 348/744, 750, 348/760; 359/204.1, 204.2
See application file for complete search history.

(56) References Cited

U.S. PATENT DOCUMENTS

| 6,309,072 | B1 | 10/2001 | Deter |
| 6,910,774 | B2 * | 6/2005 | Troyer ........................... 353/31 |

| 2005/0110959 | A1 | 5/2005 | Miyazawa et al. |
| 2006/0007407 | A1 | 1/2006 | Matsui |
| 2009/0279001 | A1 | 11/2009 | Miyazawa et al. |

FOREIGN PATENT DOCUMENTS

| JP | 9-134135 A | 5/1997 |
| JP | 2000-214529 A | 8/2000 |
| JP | 2004-302357 A | 10/2004 |
| JP | 2006-23436 A | 1/2006 |
| JP | 2007-33576 A | 2/2007 |
| JP | 2007-72031 A | 3/2007 |
| JP | 2008-39985 A | 2/2008 |
| WO | WO 2005/036874 A1 | 4/2005 |

OTHER PUBLICATIONS

Chinese Office Action dated Nov. 11, 2011, with English translation.

* cited by examiner

*Primary Examiner* — Kevin Pyo
(74) *Attorney, Agent, or Firm* — McGinn Intellectual Property Law Group, PLLC

(57) ABSTRACT

The present invention is applied to a projector that comprises a plurality of projection devices which generate images by modulating laser beams in the colors of R, G, B with optical modulators and which project the images onto projection surfaces through projection lenses, wherein the images projected respectively from said projection devices onto said projection surfaces are tiled into a single image as a whole. In the projector of the present invention, the number of G-color laser beam sources is smaller than the number of images projected respectively from said projection devices onto said projection surfaces; and said projection devices share said G-color laser beam sources and apply G-color laser beams emitted from said G-color laser beam sources to said optical modulators thereof.

10 Claims, 21 Drawing Sheets

PROJECTOR AND METHOD OF CONTROLLING THE SAME

TECHNICAL FIELD

The present invention relates to a projector and a method of controlling the same.

BACKGROUND ART

Recently, in the art of projectors, research and development efforts are being actively made to replace conventional discharge lamps with solid-state light sources such as LEDs (Light-Emitting Diodes) for better performance, smaller size, and lower cost. Rear projection TV sets and pocket projectors using LEDs as their light sources have already been in practical use.

In addition to LEDs, laser beam sources are also promising as solid-state light sources for use in projectors. Although laser beam sources undisputedly have a high potential as a light source, no projectors with laser beam sources have been in use yet because inexpensive G-color semiconductor lasers are not available for practical use and various limitations are required in view of the danger of laser beams.

Particularly, beam-scan projectors for displaying images by horizontally and vertically scanning a laser beam with an MEMS (Micro-ElectroMechanical Systems) scanner have to meet safety standards such as International laser safety standards IEC 60825 although they can be designed in a much smaller size than the existing projectors.

According to Class 1 and Class 2 (safe illumination intensity levels at which the laser beam can directly enter the eye) classified under IEC 60825, the laser beam source is required to limit its output laser power to a low level. For this reason, it is difficult for the beam-scan projectors to realize a practical sufficient brightness level, i.e. as high as the brightness level of conventional projectors with discharge lamps.

There are also known projectors of the type wherein a laser beam is not directly scanned, but is applied to a liquid crystal light valve, a DMD (Digital Micromirror Device), or a two-dimensional optical modulator such as an LCos (Liquid Crystal on Silicon), and an image generated by modulating the laser beam with the optical modulator is projected at an enlarged scale by an optical system (projection lens, etc.). The projectors of this type are considered to be of higher luminance than the beam-scan projectors.

Generally, such a projector has a single optical modulator or three optical modulators for the colors R, G, B. Projectors with a single optical modulator are lower in cost. If a single optical modulator is employed, then laser beams in the colors R, G, B are time-multiplexed and applied to the optical modulator to produce color images.

As regards lasers for use as light sources, semiconductor lasers in the colors R, B are available for practical use, but semiconductor lasers in the color G are not yet available for practical use. Although SHG (Second Harmonic Generation) lasers combined with a nonlinear crystal for wavelength conversion are available as G-color lasers, the SHG lasers are highly expensive.

There is known, as a projector with an optical modulator, a projector of the type wherein images that are projected from respective projection engines are tiled into a single image (see Patent document 1). If the projection engines incorporate respective G-color laser beam sources, then the projector of this type is highly expensive.

As described above, the projectors with optical modulators are problematic in that it is difficult to achieve both a lower cost and a higher resolution.

Patent document 1: JP No. 2008-039985A

DISCLOSURE OF THE INVENTION

It is an object of the present invention to provide a projector and a method of controlling the same which will achieve both a lower cost and a higher resolution.

According to the present invention, there is provided a projector comprising a plurality of projection devices which generate images by modulating laser beams in the colors of R, G, B with optical modulators and which project the images onto projection surfaces through projection lenses, wherein the images that are projected respectively from said projection devices onto said projection surfaces are tiled into a single image as a whole, wherein the number of G-color laser beam sources is smaller than the number of images projected respectively from said projection devices onto said projection surfaces; and said projection devices share said G-color laser beam sources and apply G-color laser beams emitted from said G-color laser beam sources to said optical modulators thereof.

According to the present invention, there is provided a first method of controlling a projector comprising a plurality of projection devices which generate images by modulating laser beams in the colors of R, G, B with optical modulators and which project the images onto projection surfaces through projection lenses, wherein the images projected respectively from said projection devices onto said projection surfaces are tiled into a single image as a whole, wherein the number of G-color laser beam sources is smaller than the number of images projected respectively from said projection devices onto said projection surfaces; said projection devices include:

a single first projection device including a G-color laser beam source; and a single second projection device other than the first projection device;

wherein said first projection device switches a light path of the G-color laser beam emitted from said G-color laser beam source over to said optical modulator thereof or to the second projection device in a time-multiplexed fashion; and said second projection device changes a light path of the G-color laser beam supplied from said first projection device to said optical modulator thereof.

According to the present invention, there is provided a second method of controlling a projector comprising a plurality of projection devices which generate images by modulating laser beams in the colors of R, G, B with optical modulators and which project the images onto projection surfaces through projection lenses, wherein the images that are projected respectively from said projection devices onto said projection surfaces are tiled into a single image as a whole, wherein the number of G-color laser beam sources is smaller than the number of images projected respectively from said projection devices onto said projection surfaces;

said projection devices include:

a single first projection device including a G-color laser beam source;

at least a single second projection device other than the first projection device; and a single third projection device other than the first projection device and the second projection device;

wherein said first projection device switches a light path of the G-color laser beam emitted from said G-color laser beam source over to said optical modulator thereof or to the second projection device in a time-multiplexed fashion;

said second projection device switches a light path of the G-color laser beam emitted from said G-color laser beam source over to said optical modulator thereof or to another second projection device or to said third projection device in a time-multiplexed fashion; and said third projection device changes the light path of the G-color laser beam emitted from said second projection device to said optical modulator thereof.

In the projector according to the present invention, the number of G-color laser beam sources is smaller than the number of images projected respectively from the projection devices onto the projection surfaces, and the projection devices share the G-color laser beam sources and apply G-color laser beams emitted from the G-color laser beam sources to said optical modulators thereof.

Therefore, since the number of G-color laser beam sources used in the projector is reduced, the cost of the projector is lowered even though a high resolution is achieved by tiling images projected respectively by the projection devices.

BEST MODE FOR CARRYING OUT THE INVENTION

A best mode for carrying out the present invention will be described below with reference to the drawings.

First Exemplary Embodiment

Figure 1:
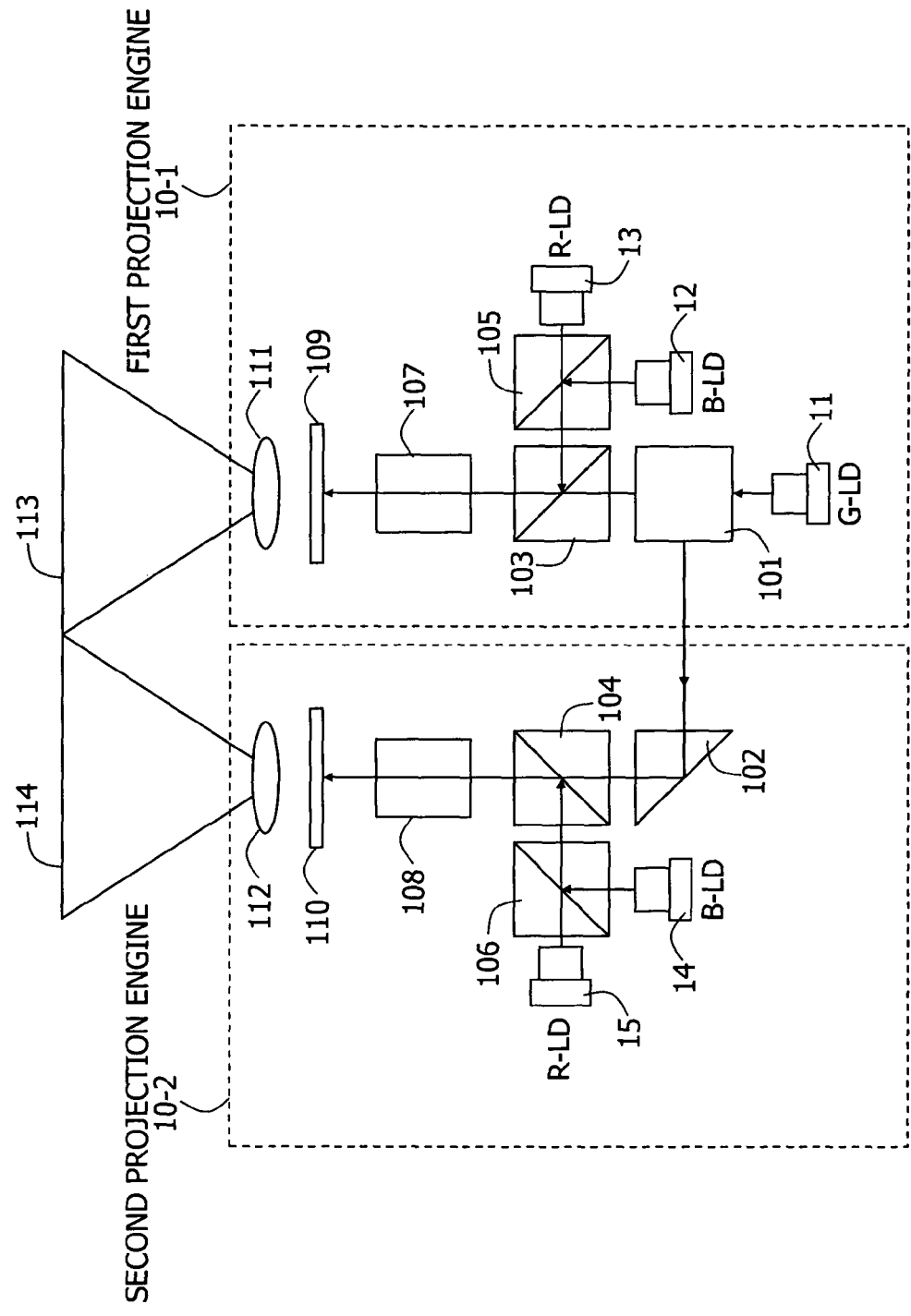
FIG. 1 is a view showing the configuration of a projector according to a first exemplary embodiment of the present invention.

FIG. 1 is a view showing the configuration of a projector according to a first exemplary embodiment of the present invention.

As shown in FIG. 1, a projector according the present exemplary embodiment comprises first projection engine 10-1 and second projection engine 10-2 each serving as a projection device.

First projection engine 10-1 includes laser beam source 11 for emitting a G-color laser beam, laser beam source 12 for emitting a B-color laser beam, laser beam source 13 for emitting an R-color laser beam, light path switcher 101, beam combiners 103, 105, rectangular conversion optical device 107, optical modulator 109, and projection lens 111.

Second projection engine 10-2 includes laser beam source 14 for emitting a B-color laser beam, laser beam source 15 for emitting an R-color laser beam, reflective optical device 102, beam combiners 104, 106, rectangular conversion optical device 108, optical modulator 110, and projection lens 112.

The structural details of first projection engine 10-1 will be described below.

Laser beam source 11 for emitting a G-color laser beam may comprise a laser beam source comprising in combination a semiconductor laser and a wavelength converter. The wavelength converter may be an SHG device having a nonlinear optical crystal, for example. If laser beam source 11 employs a semiconductor laser having a wavelength of 1040 nm, then the SHG device generates a G-color laser beam having a wavelength of 520 nm. Although laser beam source 11 should comprise in combination a semiconductor laser and a wavelength converter that are easily available, laser beam source 11 is not limited to such a combination, but may employ a DPSS (Diode-Pumped Solid-State) laser or the like.

Each of laser beam source 12 for emitting a B-color laser beam and laser beam source 13 for emitting an R-color laser beam may comprise a semiconductor laser. If laser beam source 12 and laser beam source 13 employ semiconductor lasers that are available in recent years for practical use, such as semiconductor lasers for use with DVDs (Digital Versatile Disks) or Blu-ray disks, then relatively inexpensive high-output semiconductor lasers will be readily available for use as laser beam source 12 and laser beam source 13.

Figure 2A:
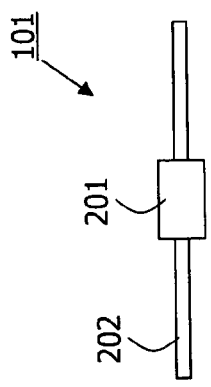
FIG. 2A is a view showing the configuration of a light path switcher according to the first exemplary embodiment of the present invention.

Light path switcher 101 serves as a means for switching over light paths for the G-color laser beam emitted from laser beam source 11. According to the present exemplary embodiment, as shown in FIG. 2A, light path switcher 101 comprises in combination motor 201 and rotatable circular flat plate 202.

According to the present exemplary embodiment, light path switcher 101 has a mechanism similar to a known color wheel for separating light from a white discharge lamp into three primary colors, R, G, B, which has been used in DLP (Digital Light Processing) projectors. Light path switcher 101 is realized based on such a known technology.

Figure 2B:
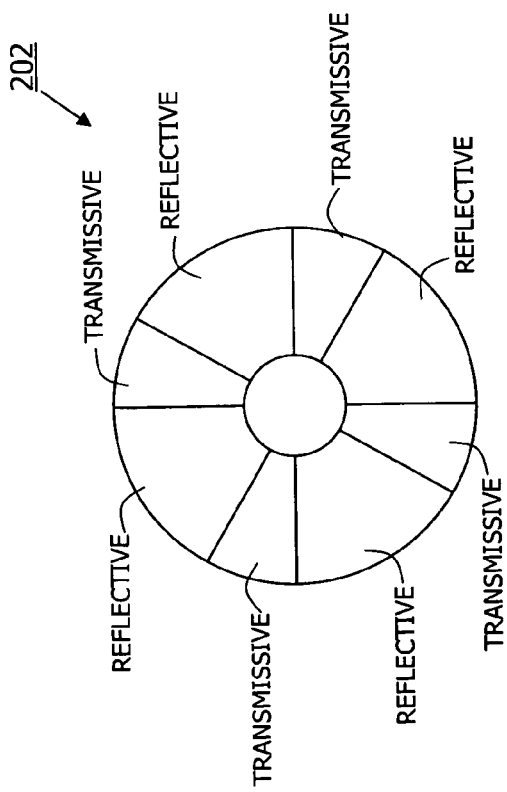
FIG. 2B is a view showing the configuration of the light path switcher according to the first exemplary embodiment of the present invention.

The color wheel includes optical filters in divided areas on a circular flat plate each for transmitting either one of the R, G, B lights. However, light path switcher 11 according to the present exemplary embodiment comprises circular flat plate 202 having divided areas which include reflective areas and transmissive areas (FIG. 2B). The proportions of the reflective areas and the transmissive areas are determined by the G-color drive timing of the field sequential drive process of optical modulators 111, 112 of first and second projection engines 10-1, 10-2 to be described later.

Figure 2C:
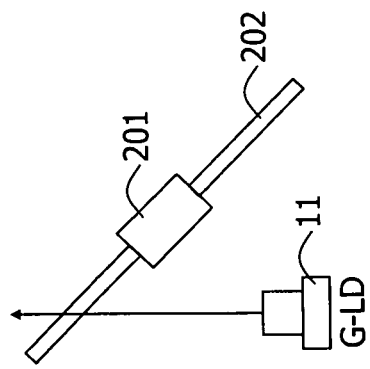
FIG. 2C is a view showing the configuration of the light path switcher according to the first exemplary embodiment of the present invention.
Figure 2D:
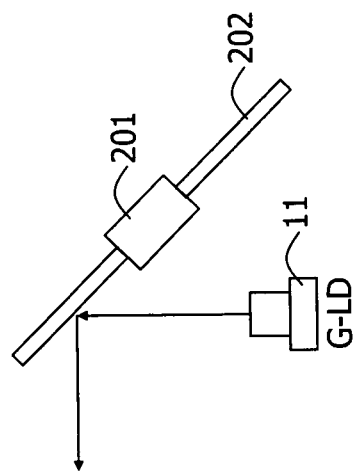
FIG. 2D is a view showing the configuration of the light path switcher according to the first exemplary embodiment of the present invention.

Light path switcher 101 and G-color laser beam source 11 should preferably be disposed in such a positional relationship that the laser beam emitted from laser beam source 11 is applied to circular flat plate 202 at an angle of 45 degrees, for example. The laser beam emitted from laser beam source 11 travels straight when it is applied to the transmissive areas of circular flat plate 202 (FIG. 2C), and is reflected at 45 degrees and changes its direction of travel when it is applied to the reflective areas of circular flat plate 202 (FIG. 2D).

Each of beam combiners 103, 105 serves as a means for unifying the directions of travel of beams in different colors. According to the present exemplary embodiment, each of beam combiners 103, 105 comprises a dichroic prism made up of two rectangular prisms bonded to each other at their slanted surfaces with a wavelength-selective dielectric multilayer film evaporated thereon. The dielectric multilayer film of beam combiner 103 has characteristics such that it transmits a G-color laser beam and reflects R- and B-color beams. The dielectric multilayer film of beam combiner 105 has such characteristics that transmits an R-color laser beam and reflects a B-color laser beam.

Each of beam combiners 103, 105 may comprise a dichroic mirror rather than a dichroic prism. Beam combiners 103, 105 described above are based on a technology that is generally used in commercially available projectors.

Rectangular conversion optical device 107 is a device for converting the beam diameter of the laser beam emitted from light combiner 103 into a beam diameter commensurate with the size of optical modulator 109. For example, rectangular conversion optical device 107 may be a combination of a lens system and an integrator. According to a known configuration of rectangular conversion optical device 107, for example, the beam diameter of the laser beam that has passed though beam combiner 103 is enlarged by a lens system, and then the laser beam is applied to a rod integrator, which focuses the illuminative information on its exit surface onto optical modulator 109. Rectangular conversion optical device 107 also serves to apply the laser beam emitted from the laser beam source efficiently to optical modulator 109.

Optical modulator 109 serves as a means for modulating the laser beam emitted as an illuminating beam from rectangular conversion optical device 107 into an image. For example, optical modulator 109 may comprise a mirror device such as a DMD, a liquid crystal light valve, or and LCoS. In first projection engine 10-1, it is desirable for optical modulator 109 to have as high a response speed as possible because a field sequential color image display process is performed to produce a color image by applying the laser beams in R, G, B to single optical modulator 109 in a time-multiplexed fashion. In FIG. 1, optical modulator 109 is schematically illustrated as a transmissive optical modulator.

Projection lens 111 serves to project an image generated by optical modulator 109 at an enlarged scale onto screen 113 which serves as a projection surface.

The structural details of second projection engine 10-2 will be described below.

Reflective optical device 102 is an optical device for changing the light path of the G-color laser beam which is emitted from first projection engine 10-1. For example, reflective optical device 102 may comprise a rectangular prism for totally reflecting an applied beam or a planar reflecting mirror.

B-color laser beam source 14, R-color laser beam source 15, beam combiners 104, 106, rectangular conversion optical device 108, optical modulator 110, and projection lens 112 may be identical in specifications to the corresponding components of first projection engine 10-1.

Operation of the projector according to the present exemplary embodiment will be described below.

As shown in FIG. 1, in first projection engine 10-1, the G-color laser beam emitted from laser beam source 11 travels straight and reaches beam combiner 103 while light path switcher 101 is selecting transmission.

Beam combiner 103 comprises a dichroic prism for transmitting the G-color laser beam and reflecting the B- and R-color laser beams. Therefore, the G-color laser beam travels straight through beam combiner 103, then has its beam diameter enlarged into a beam diameter commensurate with the size of optical modulator 109 by rectangular conversion optical device 107, and is applied to optical modulator 109.

The B- and R-color laser beams emitted respectively from laser beam sources 12, 13 are caused to travel along the same light path to beam combiner 103 by beam combiner 105 which reflects the B-color laser beam and which transmits the R-color laser beam. Then, the B- and R-color laser beams are caused by beam combiner 103 to travel along the same light path as the G-color laser beam, and are applied to rectangular conversion optical device 107. Thereafter, the B- and R-color laser beams become illuminating beams that are applied to optical modulator 109 as with the G-color laser beam.

In this manner, optical modulator 109 is irradiated with the G-, B-, and R-color laser beams. Laser beam sources 11, 12, 13 are controlled to be energized to irradiate optical modulator 109 with the G-, B-, and R-color laser beams in a repetitive pattern of G→B→R→G→B→R→ . . . , for example.

Figure 3A:
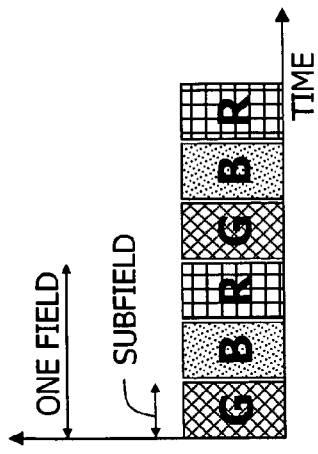
FIG. 3A is a diagram illustrative of light beams applied to an optical modulator according to the first exemplary embodiment of the present invention.

In synchronism with the energization of laser beam sources 11, 12, 13, optical modulator 109 is also energized to carry out a field sequential color image display process. Specifically, one field comprises three subfields, and the G-, B-, and R-color laser beams are assigned successively to the respective subfields. Optical modulator 109 of first projection engine 10-1 is irradiated with the G-, B-, and R-color laser beams according to a timing shown in FIG. 3A. The field sequential color image display process will further be described below.

Figure 4:
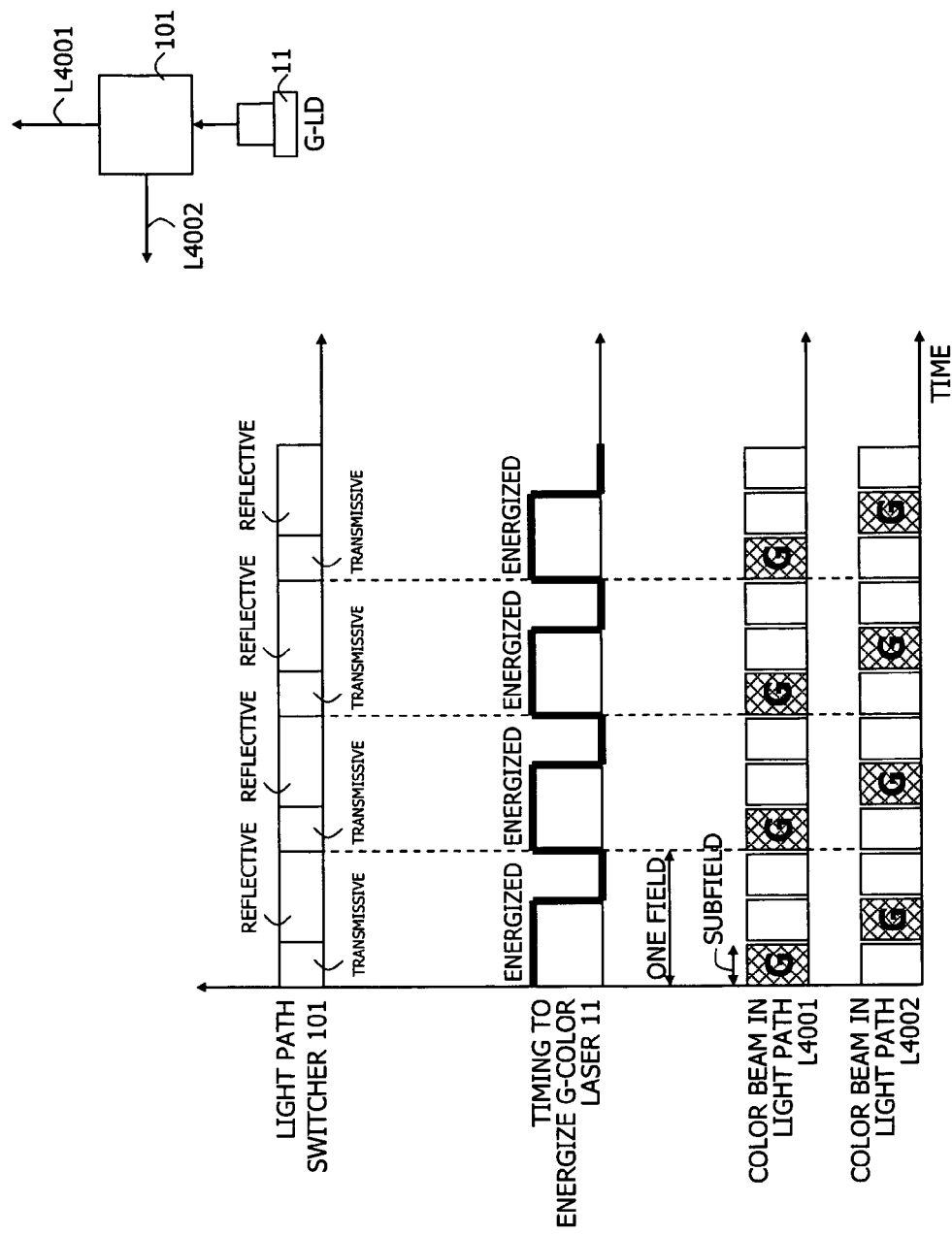
FIG. 4 is a diagram illustrative of color beams that appear in light paths that are switched over by the light path switcher according to the first exemplary embodiment of the present invention.

As shown in FIG. 4, in controlling the timing of the energization of G-color laser beam source 11, the proportions of the reflective areas and the transmissive areas of light path switcher 101 are set to (transmissive areas):(reflective areas)=1:2. With the proportions being thus set, color beams appear in transmissive light path L4001 and reflective light path L4002 of laser beam source 11 as shown in FIG. 4. At this time, the emission of laser beam source 11 is controlled such that it is energized for a period of ⅔ field and de-energized for a remaining period of ⅓ field. If it is assumed that the three subfields of each field are referred to as a first subfield, a second subfield, and a third subfield, then the G-color laser beam always appears in light path L4001 during the first subfield, and the G-color laser beam always appears in light path L4002 during the second subfield. The proportions of the reflective areas and the transmissive areas of light path switcher 101 are not limited to (transmissive areas):(reflective areas)=1:2 because during the third subfield, the emission of G-color laser beam source 11 is turned off and no laser beam is applied to light path switcher 101. Therefore, the proportions may be set to (transmissive areas):(reflective areas)=2:1.

Figure 5:
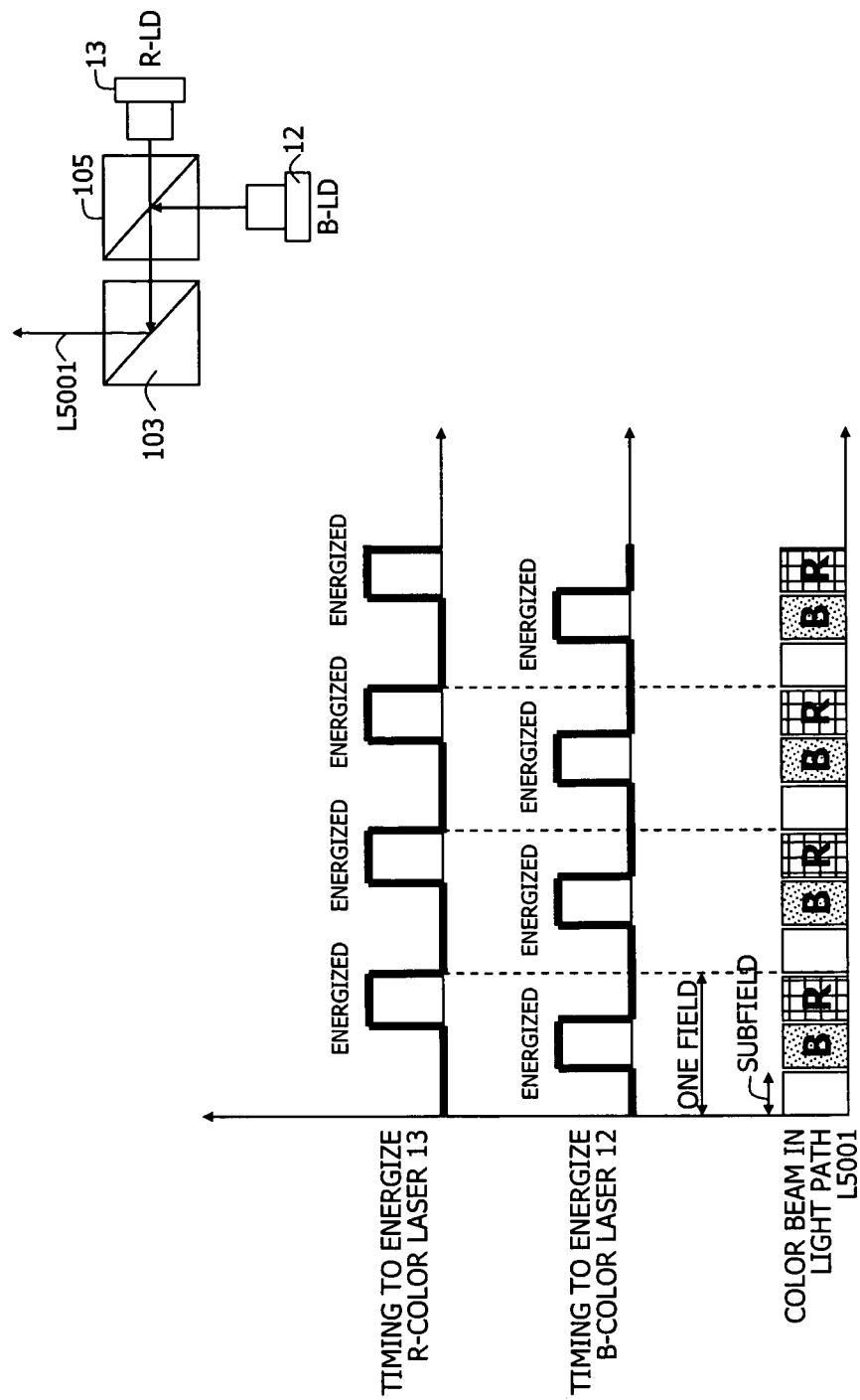
FIG. 5 is a diagram illustrative of color beams that appear in an exit light path from a beam combiner according to the first exemplary embodiment of the present invention.

The timing of the energization of B-color laser beam source 12 and R-color laser beam source 13 is controlled such that, as shown in FIG. 5, the B-color laser beam appears in light path L5001 during the second subfield of each field and the R-color laser beam appears in light path L5001 during the third subfield of each field. Thus, optical modulator 109 of first projection engine 10-1 is irradiated with the laser beams in a successive pattern of G→B→R→G→B→R→ . . . .

The laser beams that are applied to optical modulator 110 of second projection engine 10-2 will be described below.

It has been described above with reference to FIG. 4 that the color beam in light path L4002 from light path switcher 101 appears during the second subfields. Light path L4002 is a light path for supplying the G-color laser beam to second projection engine 10-2. After the G-color laser beam is supplied to second projection engine 10-2, the G-color laser beam has its light path changed by reflective optical device 102 and is transmitted through beam combiner 104 and then applied to rectangular conversion optical device 108.

Beam combiner 104 comprises a dichroic prism for transmitting the G-color laser beam, as with beam combiner 103 of first projection engine 10-1. The laser beam from B-color laser beam source 14 and the laser beam from R-color laser beam source 15 are caused to travel along the same light path to rectangular conversion optical device 108 by the characteristics of beam combiners 106, 104. Since rectangular conversion optical device 108 is identical in specifications to rectangular conversion optical device 107 of first projection engine 10-1, it irradiates optical modulator 110 with a laser beam having a beam diameter commensurate with the size of optical modulator 109.

Figure 3B:
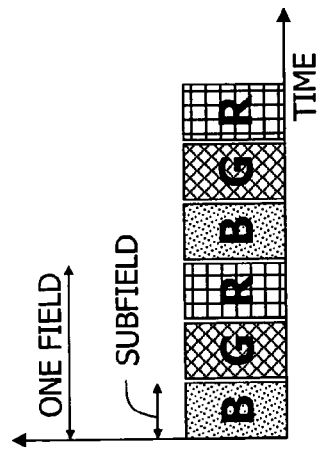
FIG. 3B is a diagram illustrative of the light beams applied to the optical modulator according to the first exemplary embodiment of the present invention.

The energization of laser beam sources 14, 15 is controlled such that optical modulator 110 is irradiated with the laser beams in a repetitive pattern of B→G→R→B→G→R→ . . . , as shown in FIG. 3B. The sequence of the applied laser beams and the energization of optical modulator 110 are synchronized to execute the field sequential color image display process. The G-color laser beam is always applied during the second subfields under the operation of light path switcher 101.

The time to start energizing the laser beam sources and the time to start de-energizing the laser beam sources are closely related to the angular position of the circular flat plate of light path switcher 101, i.e., the times at which the transmissive areas or the reflective areas are aligned with the incident laser beams. Those times can be controlled based on a known technology used to detect the angular position of the color wheel of the known discharge-lamp projectors.

The above operation will be summarized as follows: Optical modulator 109 of first projection engine 10-1 is irradiated with the laser beams in the successive pattern of G→B→R→G→B→R→ . . . , and a field sequential color image based on the color beams is projected onto screen 113.

Optical modulator 110 of second projection engine 10-2 is irradiated with the laser beams in the successive pattern of B→G→R→B→G→R→ . . . , and a field sequential color image based on the color beams is projected onto screen 114.

Figure 6:
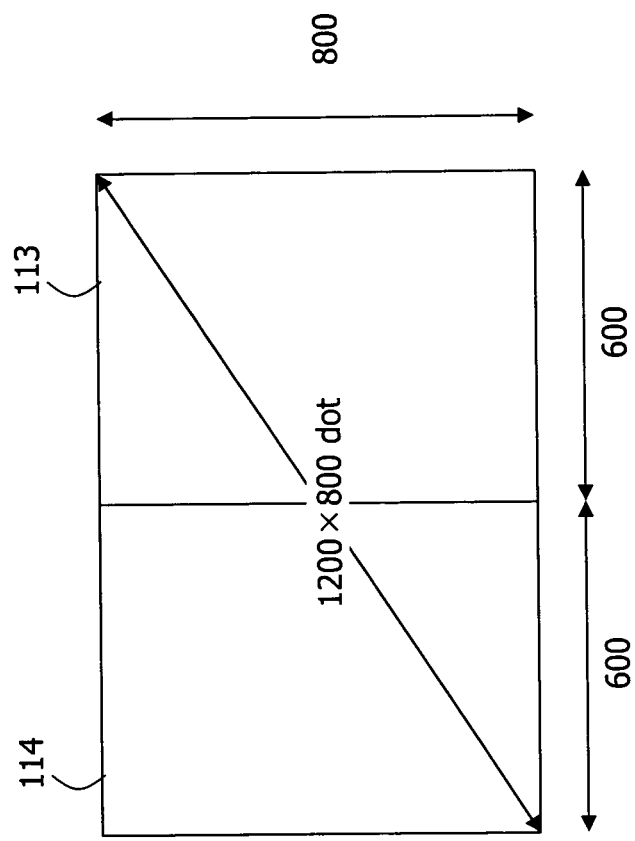
FIG. 6 is a diagram illustrative of tiled images projected from respective projection engines according to the first exemplary embodiment of the present invention.

If optical modulators 109, 110 have an SVGA (Super Video Graphics Array) resolution, then it is possible to generate a single tiled projected image of 1200×800 dots as a whole as shown in FIG. 6.

FIG. 6 shows a tiled image projected when the aspect ratio of each of respective images that are projected by two projection engines 10-1, 10-2 is expressed as a horizontal dimension:a vertical dimension=3:4. However, projected images each having an aspect ration expressed as a horizontal dimension:a vertical dimension=4:3 may be tiled and displayed as a wide image of 1600×600 dots as a whole.

According to the present exemplary embodiment, as described above, first projection engine 10-1 and second projection engine 10-2 share G-color laser beam source 11, and the G-color laser beam emitted from G-color laser beam source 11 is applied to optical modulators 109, 110.

Since the number of G-color laser beam sources 11 which are used in the entire projector is reduced to 1, the cost of the projector is lowered while at the same time a higher resolution is achieved by tiling images projected respectively by first projection engine 10-1 and second projection engine 10-2.

Second Exemplary Embodiment

Figure 7:
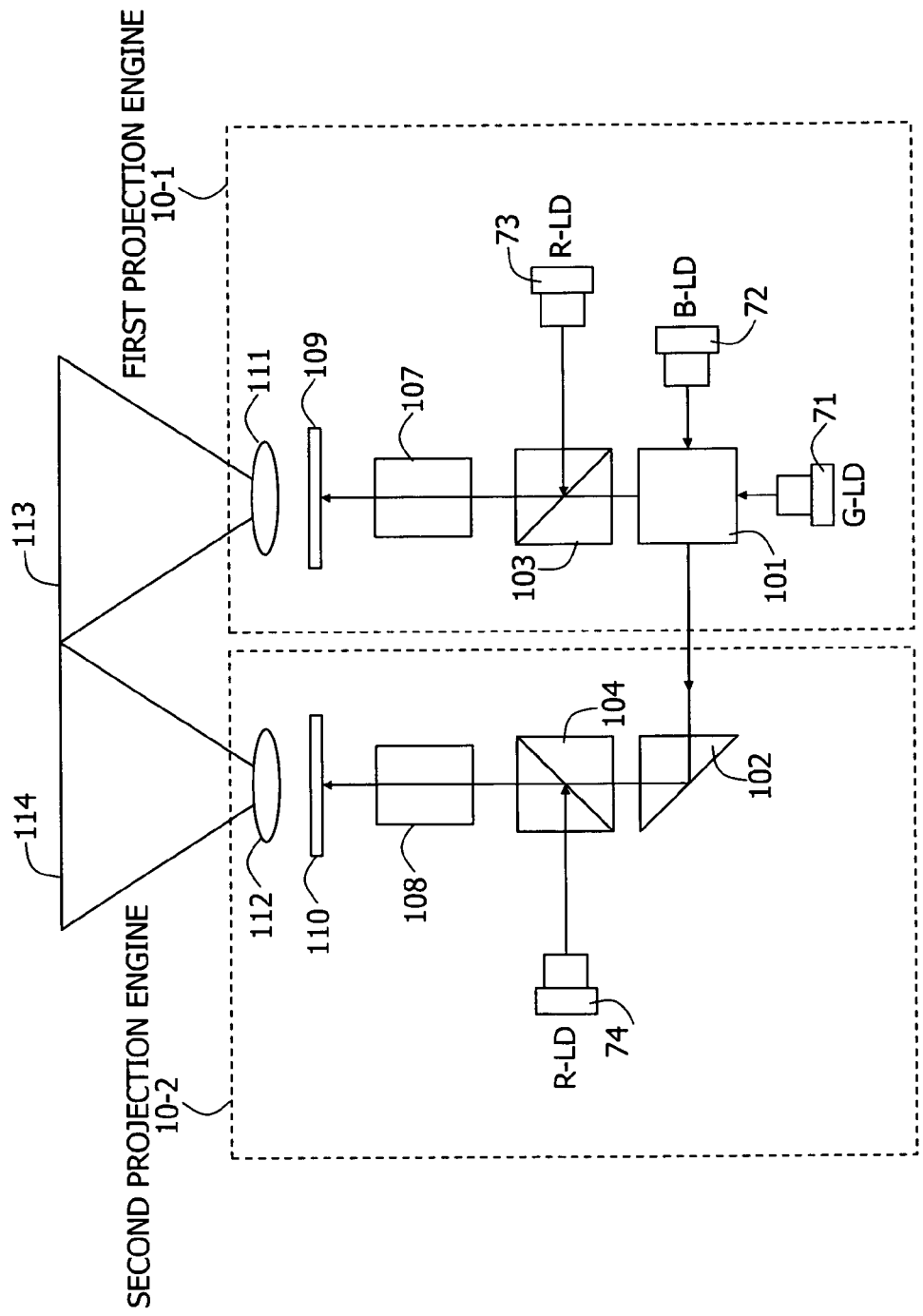
FIG. 7 is a view showing the configuration of a projector according to a second exemplary embodiment of the present invention.

FIG. 7 is a view showing the configuration of a projector according to a second exemplary embodiment of the present invention.

According to the first exemplary embodiment shown in FIG. 1, the projector as a whole employs one laser beam source for emitting a G-color laser beam, two laser beam sources for emitting a B-color laser beam, and two laser beam sources for emitting an R-color laser beam.

As shown in FIG. 7, the present exemplary embodiment is different from the first exemplary embodiment in that the number of B-color laser beam sources is reduced to 1.

Specifically, according to the present exemplary embodiment, projection engine 10-1 includes laser beam source 71 for emitting a G-color laser beam, laser beam source 72 for emitting a B-color laser beam, and laser beam source 73 for emitting an R-color laser beam, and projection engine 10-2 includes laser beam source 74 for emitting an R-color laser beam.

In each of projection engines 10-1, 10-2, accordingly, the number of beam combiners 103, 104 is reduced to 1. The other components and their layout are essentially the same as those of the first exemplary embodiment. The reduced number of laser beam sources results in a lower cost, and contributes to a reduction in size of the entire projector.

Figure 8A:
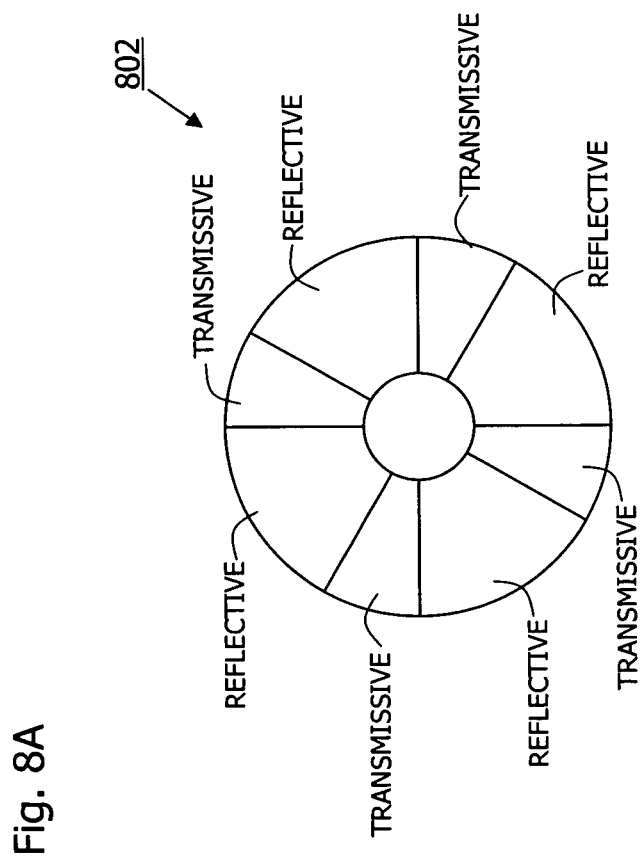
FIG. 8A is a view showing the configuration of a light path switcher according to the second exemplary embodiment of the present invention.
Figure 8B:
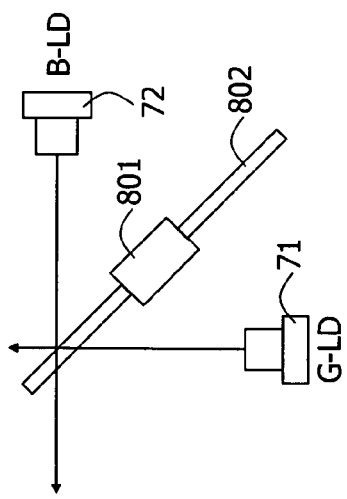
FIG. 8B is a view showing the configuration of the light path switcher according to the second exemplary embodiment of the present invention.
Figure 8C:
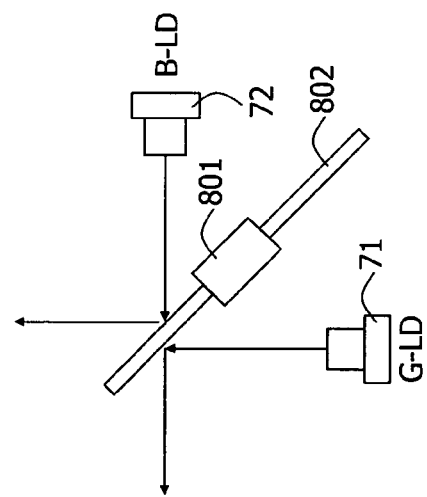
FIG. 8C is a view showing the configuration of the light path switcher according to the second exemplary embodiment of the present invention.

As shown in FIGS. 8A through 8C, light path switcher 101 according to the present exemplary embodiment comprises in combination motor 801 and rotatable circular flat plate 802.

As shown in FIGS. 8B and 8C, G-color laser beam source 71 and B-color laser beam source 72 are angularly spaced 45 degrees from a planar portion of circular flat plate 802 (FIG. 8A) having reflective areas and transmissive areas, and are disposed such that laser beams emitted respectively therefrom travel perpendicularly to each other.

Circular flat plate 802 of light path switcher 101 rotates at a prescribed speed. The laser beams emitted from laser beam source 71 and laser beam source 72 travel straight when they are applied to the transmissive areas of circular flat plate 802 (FIG. 8B), and are reflected at 45 degrees and change their direction of travel when they are applied to the reflective areas of circular flat plate 802 (FIG. 8C).

Figure 9:
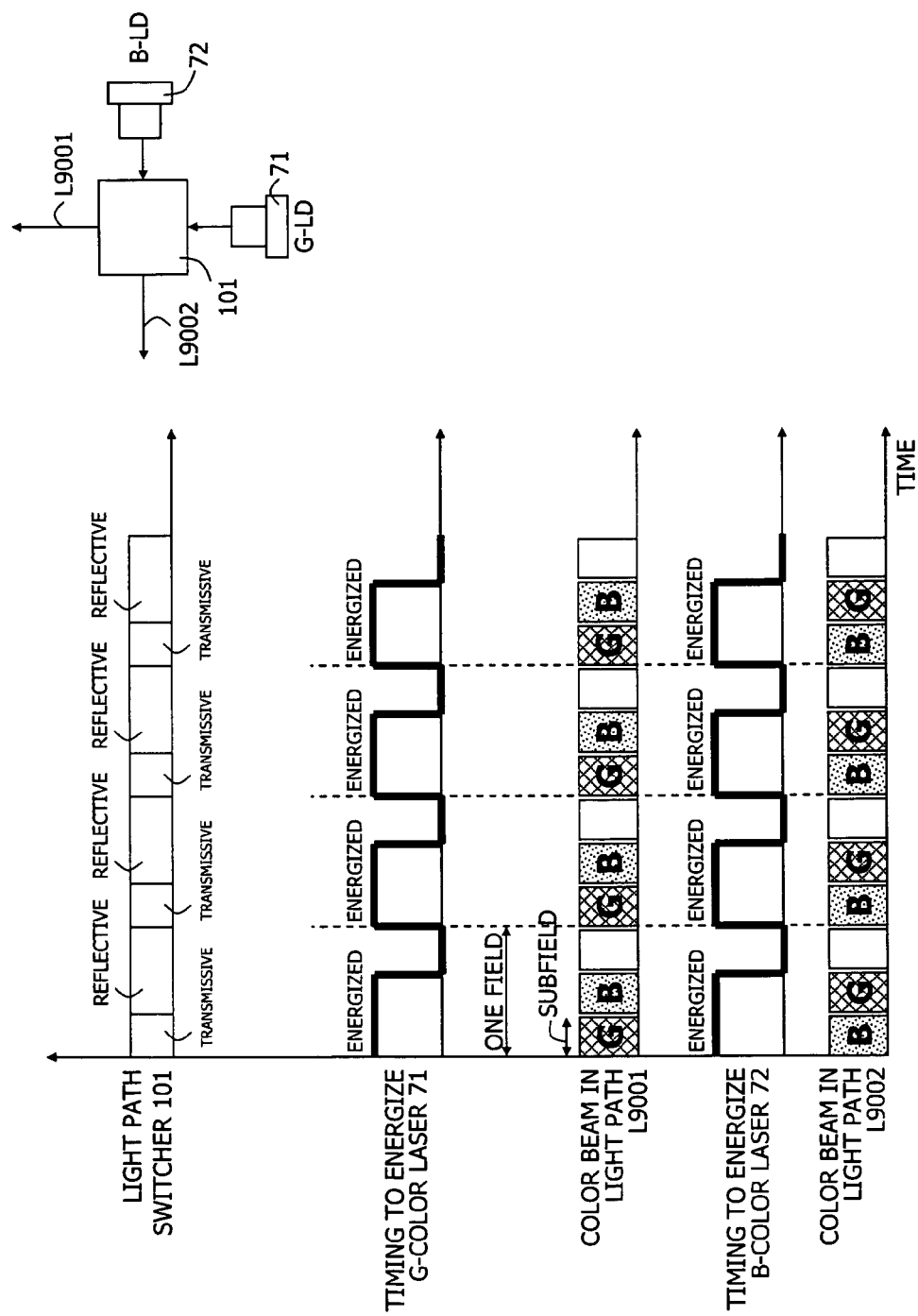
FIG. 9 is a diagram illustrative of color beams that appear in light paths that are switched over by the light path switcher according to the second exemplary embodiment of the present invention.

If the proportions of the reflective areas and the transmissive areas of circular flat plate 802 of light path switcher 101 are set to 1:2, for example, color beams appear in light path L9001 and light path L9002 as shown in FIG. 9.

At this time, the mission of the laser beam sources is controlled such that both G-color laser beam source 71 and B-color laser beam source 72 are energized for a period of ⅔ field and de-energized for a period of ⅓ field. If it is assumed that the three subfields of each field are referred to as a first subfield, a second subfield, and a third subfield, then the G-color laser beam always appears in light path L9001 during the first subfield and the B-color laser beam always appears in light path L9001 during the second subfield, and the B-color laser beam always appears in light path L9002 during the first subfield and the G-color laser beam always appears in light path L9002 during the second subfield.

Referring back to FIG. 7, the timing of the energization of R-color laser beam source 73 in first projection engine 10-1 and R-color laser beam source 74 in second projection engine 10-2 is controlled such that they are energized only during the third subfield.

Figure 10:
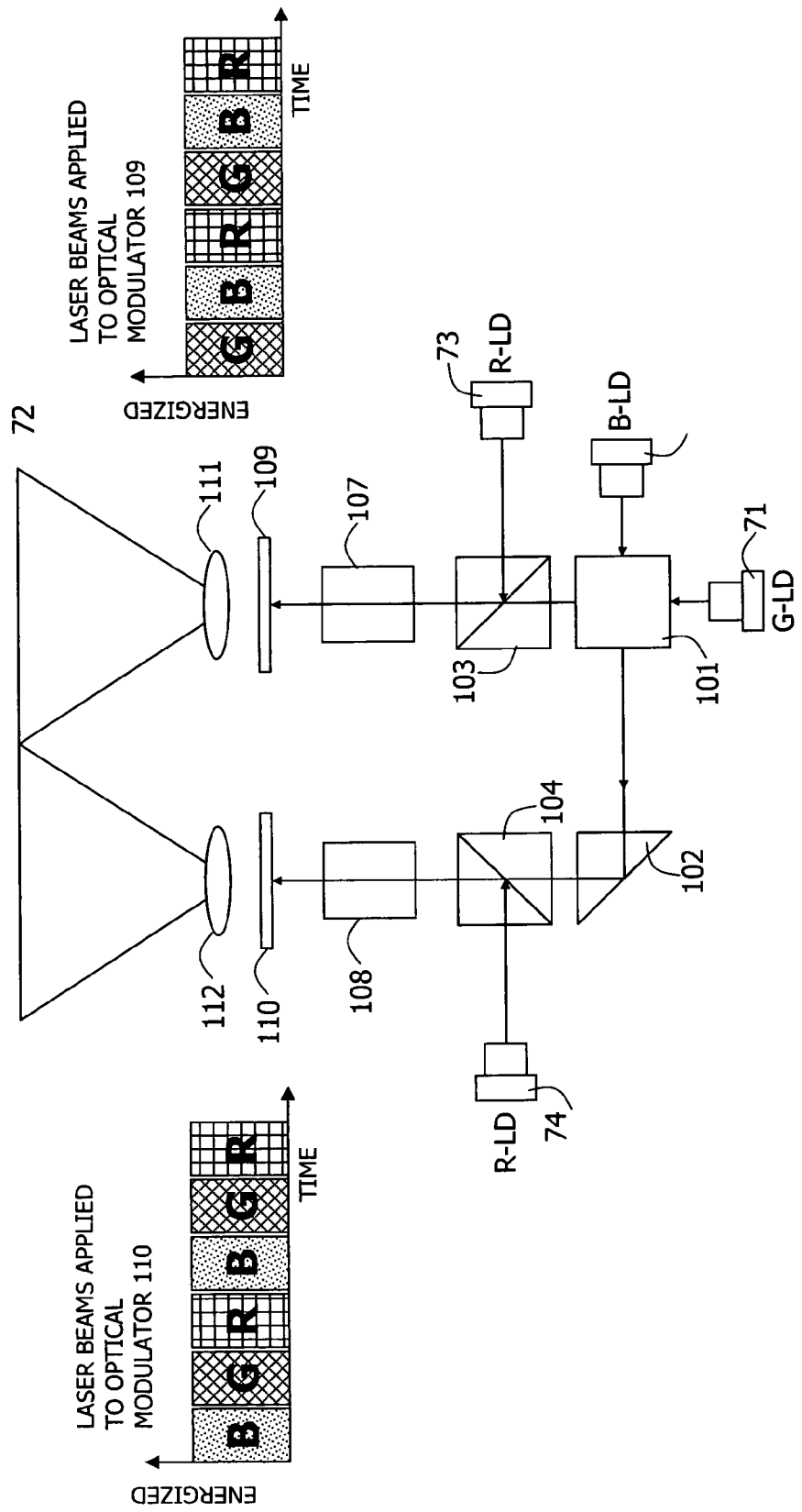
FIG. 10 is a diagram illustrative of light beams applied to an optical modulator according to the second exemplary embodiment of the present invention.

The above operation will be summarized as follows: As shown in FIG. 10, optical modulator 109 of first projection engine 10-1 is irradiated with the laser beams in a successive pattern of G→B→R→G→B→R→ . . . , and optical modulator 110 of second projection engine 10-2 is irradiated with the laser beams in a successive pattern of B→G→R→B→G→R→ . . . .

By energizing optical modulators 109, 110 in relation to the applied color beams, the two projection engines project field sequential color images onto the screens, so that the two projected images are tiled into a single color image of high resolution.

According to the present exemplary embodiment, as described above, first projection engine 10-1 and second projection engine 10-2 share B-color laser beam source 72 in addition to G-color laser beam source 71. Therefore, the projector according to the present exemplary embodiment is lower in cost than the projector according to the first exemplary embodiment.

Third Exemplary Embodiment

Figure 11:
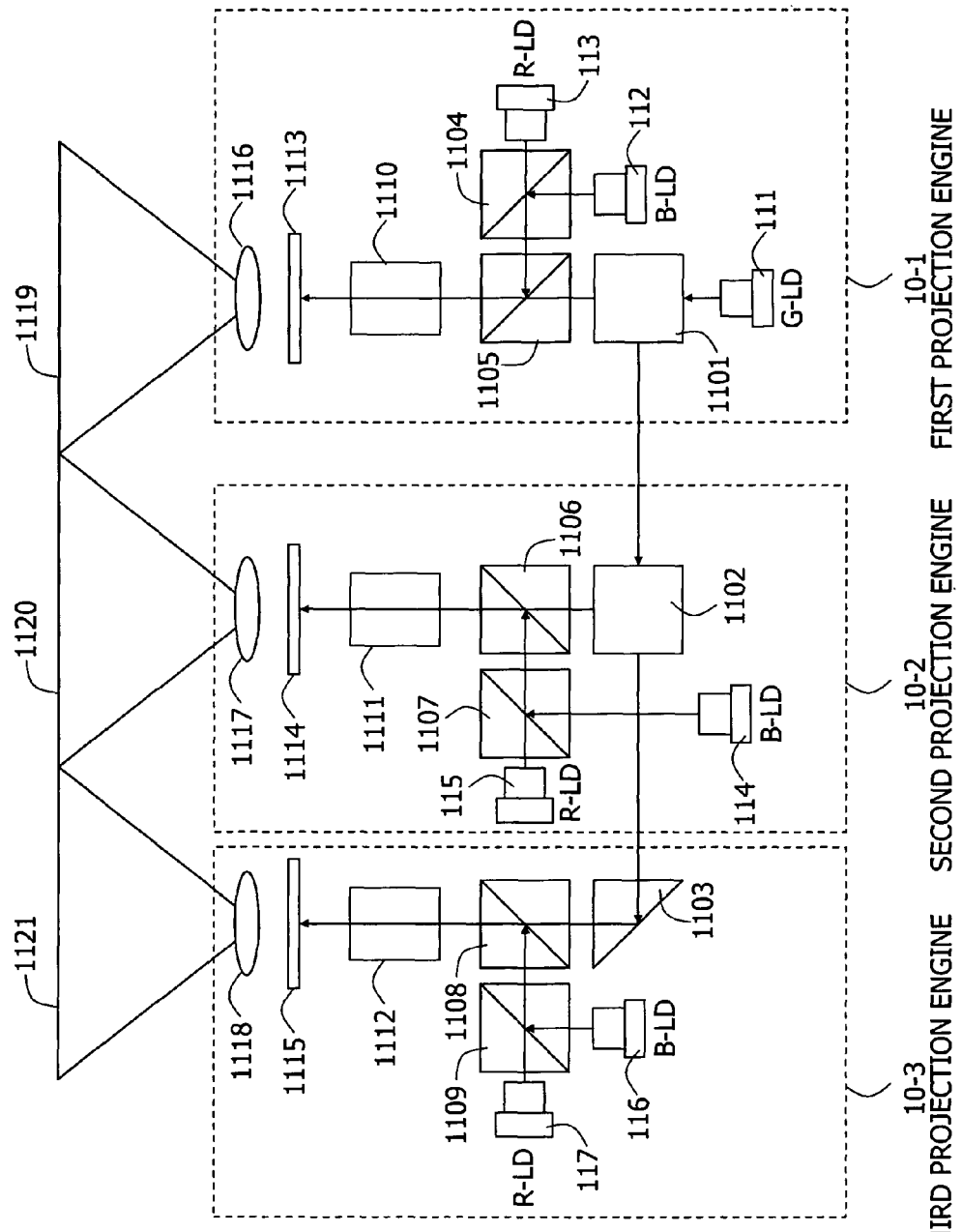
FIG. 11 is a view showing the configuration of a projector according to a third exemplary embodiment of the present invention.

FIG. 11 is a view showing the configuration of a projector according to a third exemplary embodiment of the present invention.

In the first exemplary embodiment shown in FIG. 1 and the second exemplary embodiment shown in FIG. 2, two images projected onto two screens 113, 114 are tiled into a single wide projected image of high resolution.

The present exemplary embodiment is different from the first and second exemplary embodiments in that, as shown in FIG. 11, three images that are projected onto three screens 1119, 1120, 1121 are tiled into a wider projected image.

According to the present exemplary embodiment, as with the first and second exemplary embodiments, the entire projector employs a single laser beam source for emitting a G-color laser beam.

Specifically, the projector according to the present exemplary embodiment comprises first projection engine 10-1, second projection engine 10-2, and third projection engine 10-3.

A laser beam emitted from G-color laser beam source 111 is supplied to three projection engines 10-1 through 10-3.

The projector as a whole employs one G-color laser beam source 111, three B-color laser beam sources 112, 114, 116, and three R-color laser beam sources 113, 115, 117.

Light path switchers 1101, 1102 are provided respectively in first projection engine 10-1 and second projection engine 10-2.

Specifically, first projection engine 10-1 includes laser beam sources 111, 112, 113, light path switcher 1101, beam combiners 1104, 1105, rectangular conversion optical device 1110, optical modulator 1113, and projection lens 1116.

Second projection engine 10-2 includes laser beam sources 114, 115, light path switcher 1102, beam combiners 1106, 1107, rectangular conversion optical device 1111, optical modulator 1114, and projection lens 1117.

Third projection engine 10-3 includes laser beam sources 116, 117, reflecting optical device 1103, beam combiners 1108, 1109, rectangular conversion optical device 1112, optical modulator 1115, and projection lens 1118.

The above components may be identical in specifications to the corresponding components in the first and second exemplary embodiments.

The operation of light path switchers 1101, 1102 and the timing of color beams applied in a field sequential fashion to optical modulators 1113, 1114, 1115 need to be newly described, and the other details will not be described below.

First, the laser beam emitted from G-color laser beam source 111 in first projection engine 10-1 and that is applied to optical modulators 1113, 1114, 1115 will be described below.

Figure 12:
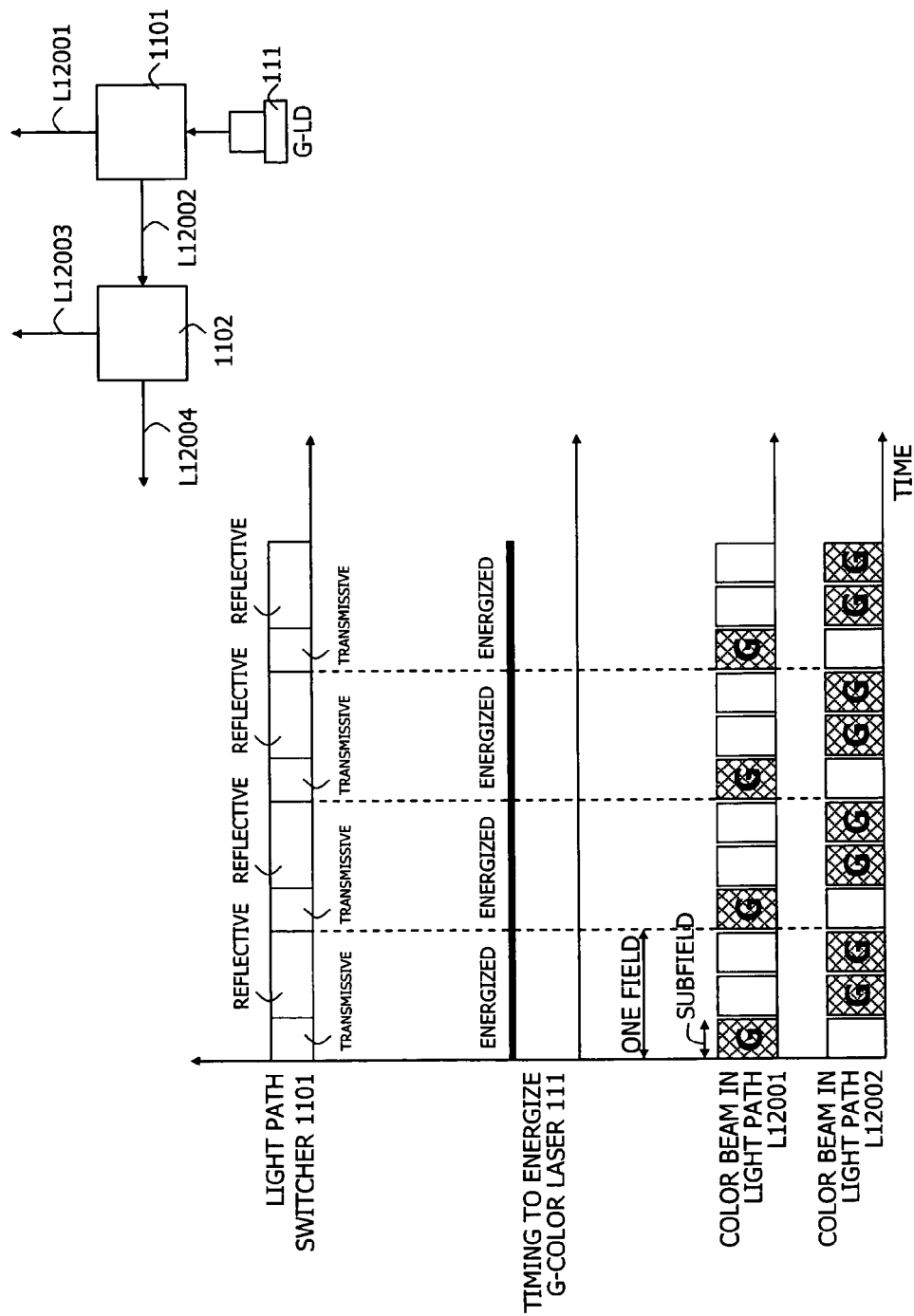
FIG. 12 is a diagram illustrative of color beams that appear in light paths that are switched over by a light path switcher according to the third exemplary embodiment of the present invention.

As shown in FIG. 12, the light path of the laser beam emitted from G-color laser beam source 11 is switched over to either transmissive light path L12001 or reflective light path L12002 by light path switcher 1101.

As described above with respect to the first exemplary embodiment, the G-color laser beam appears in transmissive light path L12001 and reflective light path L12002 depending on the proportions of the transmissive areas and the reflective areas of light path switcher 1101.

Specifically, the G-color laser beam always appears in transmissive light path L12001 during the first subframe, and becomes an illuminating beam that is applied to optical modulator 613 of first projection engine 10-1.

The G-color laser beam always appears in reflective light path L12002 during the second and third subframes, and becomes an illuminating beam that is supplied to light path switcher 1102 of second projection engine 10-2.

G-color laser beam source 61 is energized at all times.

Figure 13:
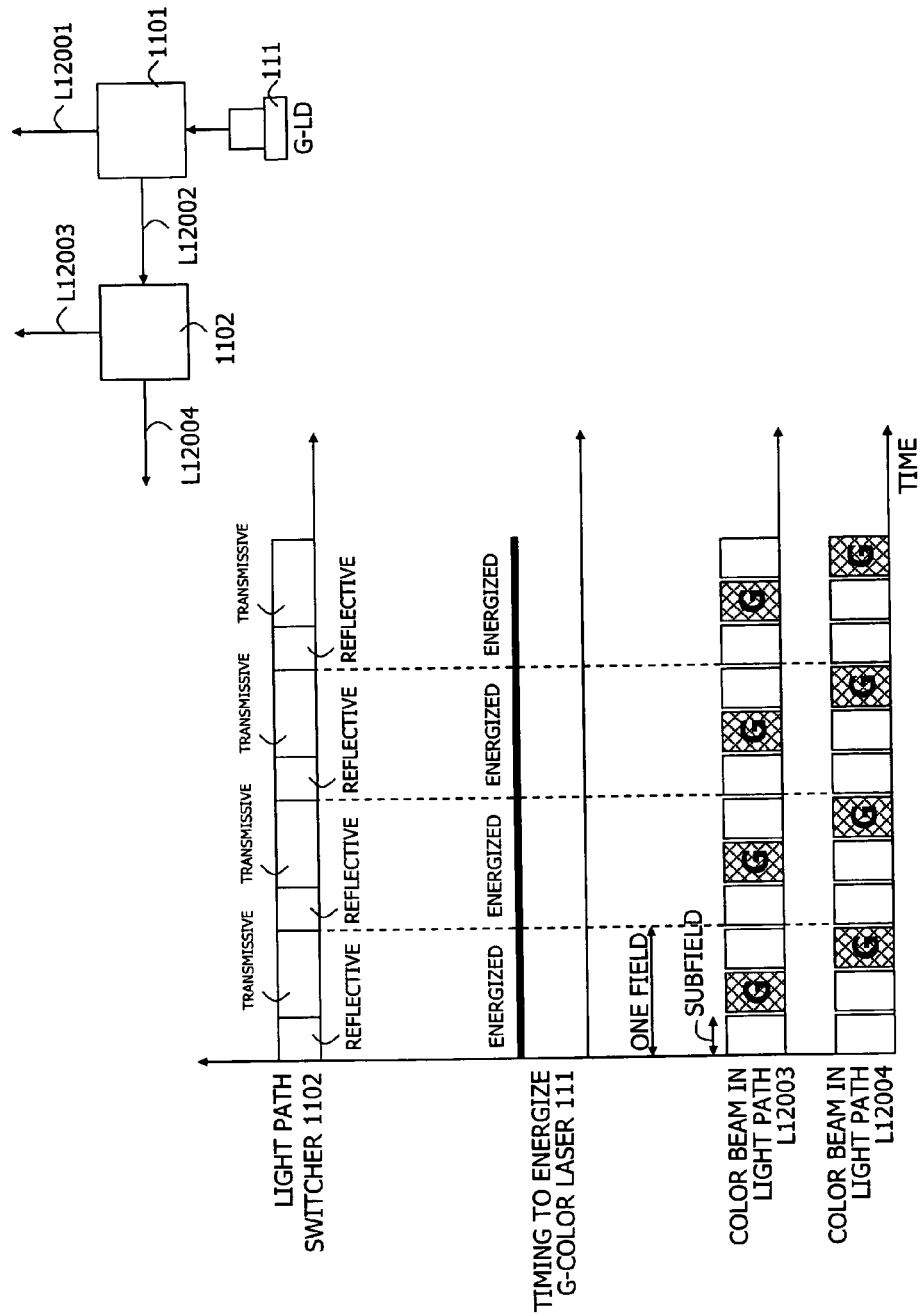
FIG. 13 is a diagram illustrative of color beams that appear in light paths that are switched over by a light path switcher according to the third exemplary embodiment of the present invention.

As shown in FIG. 13, the light path of the laser beam supplied from first projection engine 10-1 is switched over to either transmissive light path L12004 or reflective light path L12003 by light path switcher 1102.

As described above with respect to the first exemplary embodiment, the G-color laser beam appears in transmissive light path L12004 and reflective light path L12003 depending on the proportions of the transmissive areas and the reflective areas of light path switcher 1102.

Specifically, the G-color laser beam always appears in transmissive light path L12003 during the second subframe, and becomes an illuminating beam that is applied to optical modulator 614 of second projection engine 10-2.

The G-color laser beam always appears in transmissive light path L12004 during the third subframe, and is supplied to third projection engine 10-3.

The laser beams emitted from the B-color and R-color laser beam sources of first, second, and third projection engines 10-1, 10-2, 10-3 and applied to optical modulators 1113, 1114, 1115 will be described below.

Figure 14:
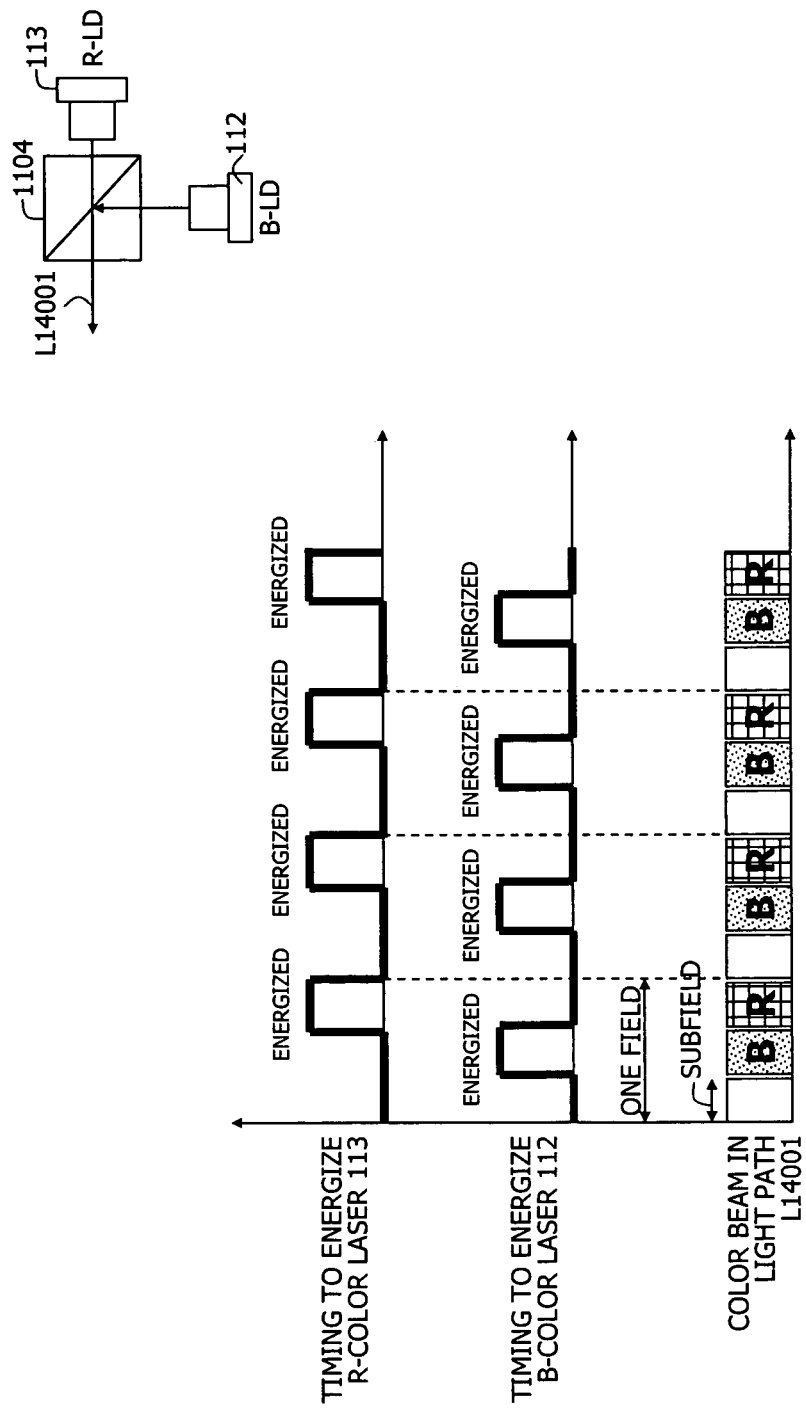
FIG. 14 is a diagram illustrative of color beams that appear in an exit light path from a beam combiner according to the third exemplary embodiment of the present invention.

In first projection engine 10-1, as shown in FIG. 14, B-color laser beam source 112 is controlled to be energized during the second subfield and R-color laser beam source 113 is controlled to be energized during the third subfield.

Figure 15:
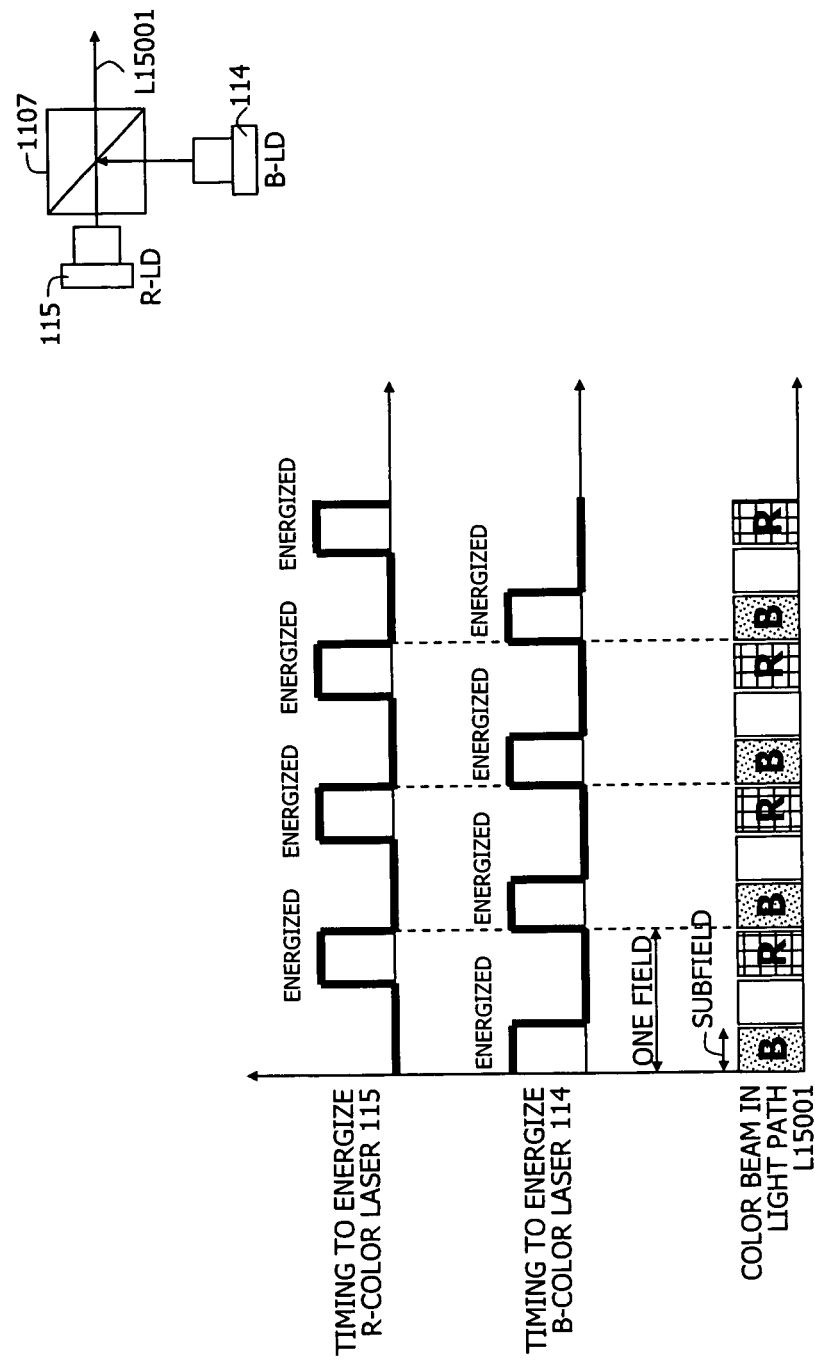
FIG. 15 is a diagram illustrative of color beams that appear in an exit light path from a beam combiner according to the third exemplary embodiment of the present invention.

In second projection engine 10-2, as shown in FIG. 15, B-color laser beam source 114 is controlled to be energized during the first subfield and R-color laser beam source 115 is controlled to be energized during the third subfield.

Figure 16:
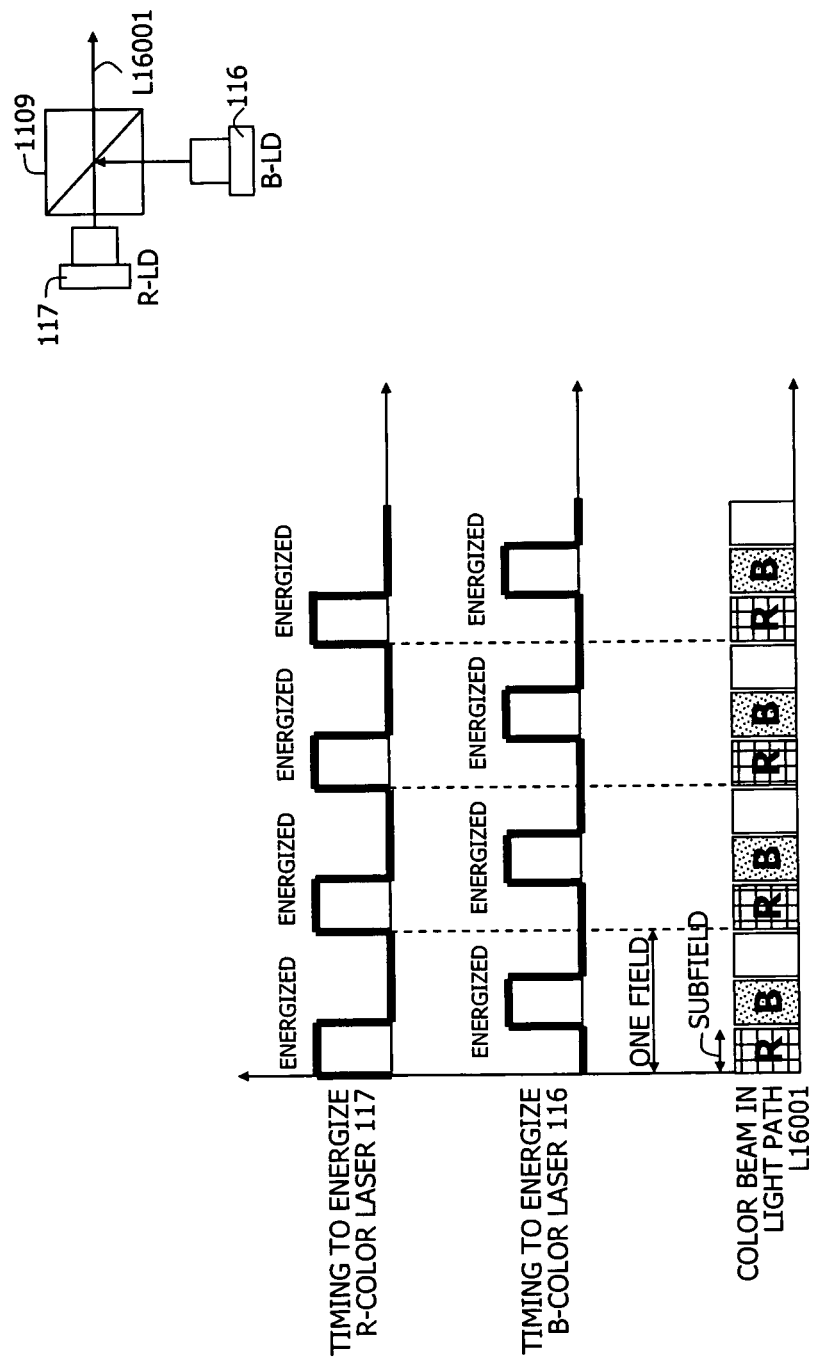
FIG. 16 is a diagram illustrative of color beams that appear in an exit light path from a beam combiner according to the third exemplary embodiment of the present invention.

In third projection engine 10-3, as shown in FIG. 16, B-color laser beam source 116 is controlled to be energized during the second subfield and R-color laser beam source 117 is controlled to be energized during the first subfield.

Figure 17A:
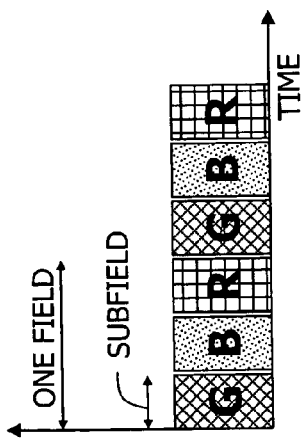
FIG. 17A is a diagram illustrative of light beams applied to an optical modulator according to the third exemplary embodiment of the present invention.
Figure 17B:
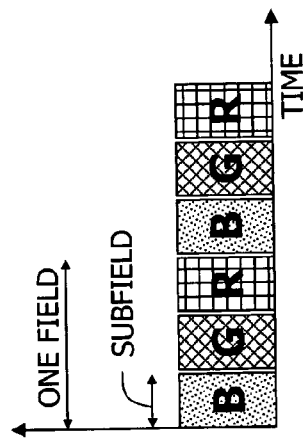
FIG. 17B is a diagram illustrative of light beams applied to an optical modulator according to the third exemplary embodiment of the present invention.
Figure 17C:
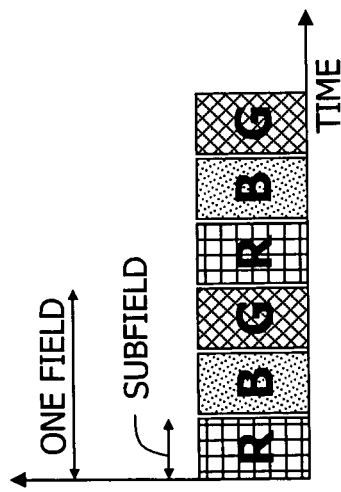
FIG. 17C is a diagram illustrative of light beams applied to an optical modulator according to the third exemplary embodiment of the present invention.

The above operation will be summarized as follows: As shown in FIGS. 17A, 17B, 17C, optical modulator 1113 of first projection engine 10-1 is irradiated with the laser beams in a successive pattern of G→B→R→G→B→R→ . . . . Optical modulator 1114 of second projection engine 10-2 is irradiated with the laser beams in a successive pattern of B→G→R→B→G→R→ . . . . Optical modulator 1115 of third projection engine 10-3 is irradiated with the laser beams in a successive pattern of R→B→G→R→B→G→ . . . .

By energizing optical modulators 1113, 1114, 1115 in relation to the applied color beams, the three projection engines project field sequential color images onto the screens, so that the three projected images are tiled into a single wide color image of very high resolution.

Figure 18:
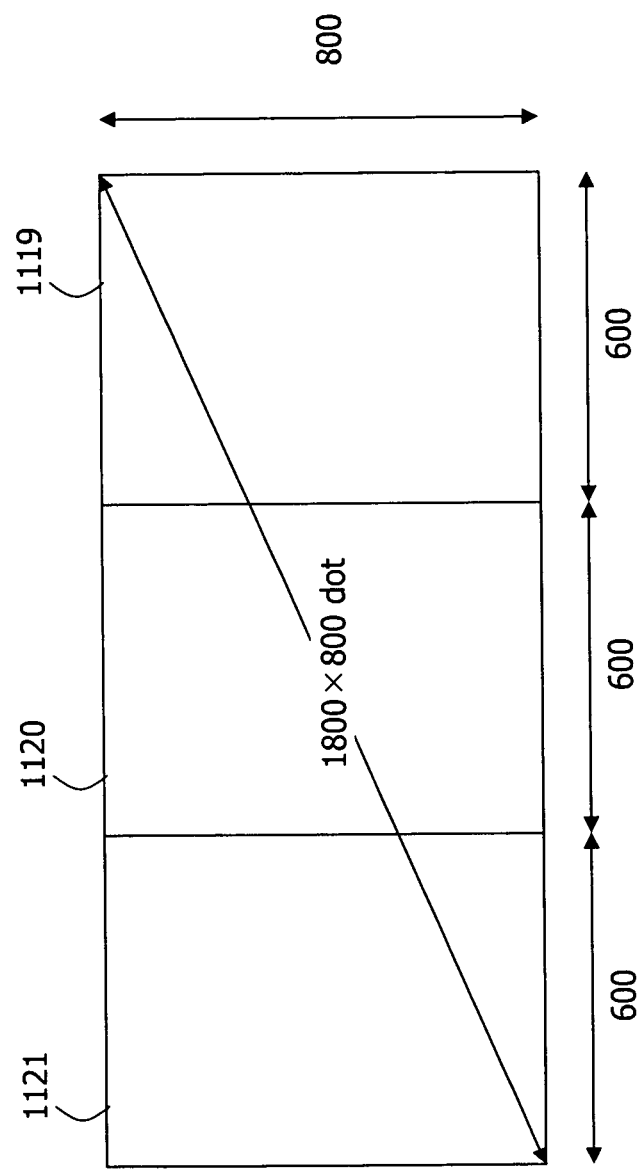
FIG. 18 is a diagram illustrative of tiled images projected from respective projection engines according to the third exemplary embodiment of the present invention.

If optical modulators 1113, 1114, 1115 have an SVGA resolution, then it is possible to generate a single tiled projected image of 1800×800 dots as a whole as shown in FIG. 18.

According to the present exemplary embodiment, as described above, since first projection engine 10-1, second projection engine 10-2, and third projection engine 10-3 share G-color laser beam source 111, the cost of the projector is reduced even though a wide color image of higher resolution is generated by tiling images that are projected by the three projection engines.

Although the exemplary embodiments of the present invention have been described above, the present invention is not limited to the above exemplary embodiments. Various changes which can be understood by those skilled in the art may be made to the configurations and details of the present invention within the scope of the invention.

For example, in the first through third exemplary embodiments, one G-color laser beam source is provided for the two or three projection engines. According to the present invention, however, the number of G-color laser beam sources may be smaller than the number of images projected by the projection engines.

In the second exemplary embodiment, one B-color laser beam source is provided for the two projection engines. According to the present invention, however, the number of B-color laser beam sources may be smaller than the number of images that are projected by the projection engines. Alternatively, the number of R-color laser beam sources, rather than B-color laser beam sources, may be smaller than the number of images projected by the projection engines.

The invention claimed is:

1. A projector, comprising:
a plurality of projection devices which generate images by modulating laser beams in colors of R, G, B with optical modulators and which project the images onto projection surfaces through projection lenses,
wherein the images that are projected respectively from said projection devices onto said projection surfaces are tiled into a single image as a whole,
wherein a number of G-color laser beam sources is smaller than a number of images projected respectively from said projection devices onto said projection surfaces,
wherein said projection devices share said G-color laser beam sources and apply G-color laser beams emitted from said G-color laser beam sources to said optical modulators thereof,
wherein said projection devices include:
a single first projection device including a G-color laser beam source of said G-color laser beam sources; and
a single second projection device other than the first projection device,
wherein said first projection device includes a light path switcher for switching a light path of the G-color laser beam emitted from said G-color laser beam source over to said optical modulator thereof or to the second projection device in a time-multiplexed fashion, and
wherein said second projection device includes a reflective device for changing a light path of the G-color laser beam supplied from said first projection device to said optical modulator thereof.

2. A projector, comprising:
a plurality of projection devices which generate images by modulating laser beams in colors of R, G, B with optical modulators and which project the images onto projection surfaces through projection lenses,
wherein the images that are projected respectively from said projection devices onto said projection surfaces are tiled into a single image as a whole,
wherein a number of G-color laser beam sources is smaller than a number of images projected respectively from said projection devices onto said projection surfaces,
wherein said projection devices share said G-color laser beam sources and apply G-color laser beams emitted from said G-color laser beam sources to said optical modulators thereof,
wherein said projection devices include:
a single first projection device including a G-color laser beam source of said G-color laser beam sources;
at least a single second projection device other than the first projection device; and
a single third projection device other than the first projection device and the second projection device, wherein said first projection device includes a first light path switcher for switching a light path of the G-color laser beam emitted from said G-color laser beam source over to said optical modulator thereof or to the second projection device in a time-multiplexed fashion, wherein said second projection device includes a second light path switcher for switching a light path of the G-color laser beam emitted from said G-color laser beam source over to said optical modulator thereof or to another second projection device or to said third projection device in a time-multiplexed fashion, and wherein said third projection device includes a reflecting device for changing a light path of the G-color laser beam emitted from said second projection device to said optical modulator thereof.

3. A method of controlling a projector comprising a plurality of projection devices which generate images by modulating laser beams in colors of R, G, B with optical modulators and which project the images onto projection surfaces through projection lenses, wherein the images that are projected respectively from said projection devices onto said projection surfaces are tiled into a single image as a whole, wherein a number of G-color laser beam sources is smaller than a number of images that are projected respectively from said projection devices onto said projection surfaces, wherein said projection devices include:
a single first projection device including a G-color laser beam source; and
a single second projection device other than the first projection device, wherein said first projection device switches a light path of the G-color laser beam emitted from said G-color laser beam source over to said optical modulator thereof or to the second projection device in a time-multiplexed fashion, and wherein said second projection device changes a light path of the G-color laser beam supplied from said first projection device to said optical modulator thereof.

4. A method of controlling a projector comprising a plurality of projection devices which generate images by modulating laser beams in colors of R, G, B with optical modulators and which project the images onto projection surfaces through projection lenses, wherein the images that are projected respectively from said projection devices onto said projection surfaces are tiled into a single image as a whole, wherein a number of G-color laser beam sources is smaller than a number of images projected respectively from said projection devices onto said projection surfaces, wherein said projection devices include:
a single first projection device including a G-color laser beam source;
at least a single second projection device other than the first projection device; and
a single third projection device other than the first projection device and the second projection device, wherein said first projection device switches a light path of the G-color laser beam emitted from said G-color laser beam source over to said optical modulator thereof or to the second projection device in a time-multiplexed fashion, wherein said second projection device switches a light path of the G-color laser beam emitted from said G-color laser beam source over to said optical modulator thereof or to another second projection device or said third projection device in a time-multiplexed fashion, and wherein said third projection device changes a light path of the G-color laser beam emitted from said second projection device to said optical modulator thereof.

5. A projector, comprising:
a plurality of projection devices which generate images by modulating laser beams in colors of R, G, B with optical modulators and which project the images onto projection surfaces through projection lenses, wherein the images that are projected respectively from said projection devices onto said projection surfaces are tiled into a single image as a whole, wherein a number of G-color laser beam sources is smaller than a number of images projected respectively from said projection devices onto said projection surfaces, and wherein said projection devices share said G-color laser beam sources and apply G-color laser beams emitted from said G-color laser beam sources to said optical modulators thereof in a time-multiplexed fashion;

a first projection device including a G-color laser beam source of said G-color laser beam sources; and a second projection device other than the first projection device, wherein said first projection device includes a light path switcher for switching light path of the G-color laser beam emitted from said G-color laser beam source over to said optical modulator thereof or to the second projection device, and wherein said light path switcher switches the light path of the G-color laser beam emitted from said G-color laser beam source over to said optical modulator thereof or to the second projection device in a time-multiplexed fashion.

6. The projector according to claim 5, wherein said second projection device includes a reflective device for changing a light path of the G-color laser beam supplied from said first projection device to said optical modulator thereof.

7. The projector according to claim 5, wherein said second projection device includes a reflective device for changing a light path of the G-color laser beam supplied from said first projection device to said optical modulator thereof.

8. The projector according to claim 5, wherein said projection devices further comprise:
a third projection device other than the first projection device and the second projection device.

9. The projector according to claim 8, wherein said second projection device includes a second light path switcher for switching the light path of the G-color laser beam emitted from said G-color laser beam source over to said optical modulator thereof or to another second projection device or to said third projection device in a time-multiplexed fashion.

10. The projector according to claim 9, wherein said third projection device includes a reflecting device for changing a light path of the G-color laser beam emitted from said second projection device to said optical modulator thereof.

* * * * *